United States Patent
Kobayashi (10) Patent No.: US 9,076,096 B2
(45) Date of Patent: Jul. 7, 2015

(54) IMAGE FORMATION APPARATUS AND METHOD FOR PROCESSING PRINT SETTING INFORMATION

(75) Inventor: Norihiko Kobayashi, Fujisawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 68 days.

(21) Appl. No.: 13/415,397

(22) Filed: Mar. 8, 2012

(65) Prior Publication Data

US 2012/0236329 A1    Sep. 20, 2012

(30) Foreign Application Priority Data

Mar. 17, 2011    (JP) .................................. 2011-059657

(51) Int. Cl.
 *G06K 15/02*    (2006.01)
(52) U.S. Cl.
 CPC ........ *G06K 15/1805* (2013.01); *G06K 15/1809* (2013.01)
(58) Field of Classification Search
 USPC ..................... 358/1.2, 1.6, 1.9, 1.13–16, 1.18
 See application file for complete search history.

(56) References Cited

U.S. PATENT DOCUMENTS

| | | | | |
|---|---|---|---|---|
| 6,456,732 | B1* | 9/2002 | Kimbell et al. ............... | 382/112 |
| 7,257,770 | B2* | 8/2007 | Narahara ...................... | 715/234 |
| 2005/0012954 | A1* | 1/2005 | Onuma et al. ................ | 358/1.13 |
| 2005/0038919 | A1* | 2/2005 | Matsubara et al. ............ | 710/1 |
| 2006/0106775 | A1* | 5/2006 | Kuhn et al. ................... | 707/3 |
| 2007/0296993 | A1* | 12/2007 | Bai ............................... | 358/1.13 |
| 2008/0037049 | A1* | 2/2008 | Bahl et al. .................... | 358/1.13 |
| 2008/0204806 | A1* | 8/2008 | Tao et al. ...................... | 358/1.16 |
| 2009/0021757 | A1* | 1/2009 | Liu et al. ...................... | 358/1.13 |
| 2009/0040569 | A1* | 2/2009 | Hamzy ......................... | 358/488 |
| 2009/0161146 | A1* | 6/2009 | Ireland ......................... | 358/1.15 |
| 2009/0244554 | A1* | 10/2009 | Yamanouchi ................. | 358/1.2 |
| 2010/0053668 | A1* | 3/2010 | Huh et al. .................... | 358/1.15 |
| 2010/0103436 | A1* | 4/2010 | Kim et al. .................... | 358/1.6 |
| 2010/0118332 | A1* | 5/2010 | Nakata ......................... | 358/1.15 |
| 2010/0123935 | A1* | 5/2010 | Yamashita .................... | 358/1.15 |
| 2010/0131486 | A1* | 5/2010 | Widjaja et al. ............... | 707/708 |
| 2010/0178067 | A1* | 7/2010 | Azami et al. ................. | 399/16 |
| 2010/0238493 | A1* | 9/2010 | Sako et al. .................... | 358/1.15 |
| 2011/0032549 | A1* | 2/2011 | Komatsu et al. .............. | 358/1.9 |

(Continued)

FOREIGN PATENT DOCUMENTS

| | | | | |
|---|---|---|---|---|
| CN | 101727588 A | 6/2010 | | |
| JP | 2004164233 A | * 6/2004 | ............... | G06F 3/12 |

(Continued)

OTHER PUBLICATIONS

Chinese Office Action issued in corresponding application No. 201210066853.6 on Jun. 25, 2014.

*Primary Examiner* — Ashish K Thomas
*Assistant Examiner* — Edwin S Leland, III
(74) *Attorney, Agent, or Firm* — Carter, DeLuca, Farrell & Schmidt, LLP (57) ABSTRACT

Determination is made as to whether print setting information is designated for received print data, the print setting information being for designating a physical sheet size to be used for printing. When the print setting information is not designated and when specific character string information in the print data is set, a logical sheet size is set as the physical sheet size, and when specific character string information in the print data is not set, a default sheet size is set as the physical sheet size.

16 Claims, 4 Drawing Sheets

(56) References Cited

U.S. PATENT DOCUMENTS

| | | | |
|---|---|---|---|
| 2011/0032555 A1* | 2/2011 | Mizutani et al. | 358/1.9 |
| 2011/0051173 A1* | 3/2011 | Yagishita | 358/1.14 |
| 2011/0055693 A1* | 3/2011 | Yoshimoto et al. | 715/274 |
| 2011/0063658 A1* | 3/2011 | Natori | 358/1.15 |
| 2011/0075216 A1* | 3/2011 | Toizumi et al. | 358/1.15 |
| 2011/0080614 A1* | 4/2011 | Sasaki | 358/1.18 |
| 2011/0113321 A1* | 5/2011 | Han et al. | 715/234 |
| 2011/0122441 A1* | 5/2011 | Shiohara | 358/1.15 |
| 2011/0235064 A1* | 9/2011 | Arai | 358/1.2 |
| 2011/0273735 A1* | 11/2011 | Koura | 358/1.13 |
| 2011/0310402 A1* | 12/2011 | Mizutani | 358/1.2 |
| 2012/0120431 A1* | 5/2012 | Kino | 358/1.13 |
| 2012/0219151 A1* | 8/2012 | Mano | 380/51 |

FOREIGN PATENT DOCUMENTS

| | | | | |
|---|---|---|---|---|
| JP | 2006256167 A | * | 9/2006 | B41J 5/30 |
| JP | 2007-079819 A | | 3/2007 | |
| JP | 2007079819 A | * | 3/2007 | G06F 3/12 |
| JP | 2008012832 A | * | 1/2008 | B41J 29/38 |

* cited by examiner

IMAGE FORMATION APPARATUS AND METHOD FOR PROCESSING PRINT SETTING INFORMATION

BACKGROUND OF THE INVENTION

1. Field of the Invention

The present invention relates to image formation apparatuses and methods for processing print setting information.

2. Description of the Related Art

Recent printers and digital multifunctional printers (hereinafter called "image formation apparatuses") can support a plurality of types of page-description languages (PDL) for printing. Such image formation apparatuses are capable of receiving PDL data from a personal computer (PC) for printing and of digitizing information printed on paper using a scanner (image reader) attached thereto and converting the digitized information into a file format designated by a user as well. A created file can be stored in a device or on a server depending on the user's usage and can be designated for printing as needed. Such a file can be sent directly to a designated mail address, and a user can easily use the file with a PC.

Image files created by the image formation apparatuses may have a plurality of file formats. Formats such as PDF, PS and XPS are typically known. These formats, however, are different in the way of indicating sheet sizes for printing. They are roughly categorized into two types: a physical sheet size that defines a sheet size for actual printing (hereinafter called a physical sheet size); and a size representing the area of a page used for display in an application or the like (hereinafter called a logical sheet size).

Some file formats use both of the types, others use only one of them, and the information on a sheet size that is required differs between file formats.

Additionally, information indicating a sheet size varies with the method of inputting print data to an image formation apparatus. One exemplary method for inputting print data to an image formation apparatus directly designates a file for printing in a printing system or on a server from a host PC via a printer driver. Typically, however, an easy-portable device such as a USB memory is connected to the apparatus, and a file in the device is directly designated.

The printing system using a printer driver adds a print setting set by the printer driver to an original value of an electronic file and sends the same to the image formation apparatus. On the other hand, when connecting a device such as a USB memory, a file in the USB memory is directly designated as print data. At this time, in the case of a file not having print setting information in the file format itself (e.g., an XPS file or a PS file), unless print setting information is correctly set therefor, a user cannot perform printing as expected. To cope with this, Japanese Patent Laid-Open No. 2007-079819 discloses a method for, for a file without a physical sheet size, automatically selecting a sheet using information corresponding to a logical sheet size of a bounding box or similar information, for example.

Files having only a logical sheet size set, however, are created in various cases. In the aforementioned conventional technique, a sheet size is uniquely decided always using a logical sheet size irrespective of the situation in which the file was created, and therefore the sheet output might have a size not intended by the user. For instance, when a file of an XPS format is saved with PowerPoint, the file does not have a PrintTicket added thereto. At this time, when a page size is designated as A4, the width and the height of a fixed page indicating a sheet size for display (logical sheet size) will be set at a smaller size than the size of A4. Then, conventionally an appropriate sheet size is selected using this logical sheet size.

However, when a sheet having a size closer to the width and the height designated as the fixed page is set for the image formation apparatus, a sheet that not A4 might be used as a physical sheet size and be output against the user's intention. Therefore, using a logical sheet size unconditionally may lead to the output of a sheet size not intended by the user.

SUMMARY OF THE INVENTION

The present invention provides an apparatus and a method for, when print setting information to be used for printing is not designated for print data, generating print setting information from specific character string information in the print data.

According to one aspect of the present invention, there is provided an image formation apparatus, comprising: a determination unit that determines whether or not print setting information is designated for received print data, the print setting information being for designating a physical sheet size to be used for printing; and a settles unit that, when it is determined that the print setting information is not designated and when specific character string information in the print data is set, sets a logical sheet size as the physical sheet size, and when specific character string information in the print data is not set, sets a default sheet size as the physical sheet size.

According to another aspect of the present invention, there is provided a method for processing print setting information, the method being executed in an image formation apparatus, comprising: determining whether or not print setting information is designated for received print data, the print setting information being for designating a physical sheet size to be used for printing; and when it is determined that the print setting information is not designated and when specific character string information in the print data is set, setting a logical sheet size as the physical sheet size, and when specific character string information in the print data is not set, setting a default sheet size as the physical sheet size.

Further features of the present invention will become apparent from the following description of exemplary embodiments with reference to the attached drawings.

DESCRIPTION OF THE EMBODIMENTS

The following describes embodiments of the present invention in detail, with reference to the drawings. The following embodiments exemplify a multifunction peripheral (MFP) provided with a plurality of functions such as a scanning function and a printing function as an image formation apparatus, but the image formation apparatus is not limited to this, and may be a single functional printer (SFP) or a laser beam printer (LBP). Printers of other printing types such as of an ink jet type may be used as well.

Structure of a System Including a Multifunction Peripheral

Figure 1:
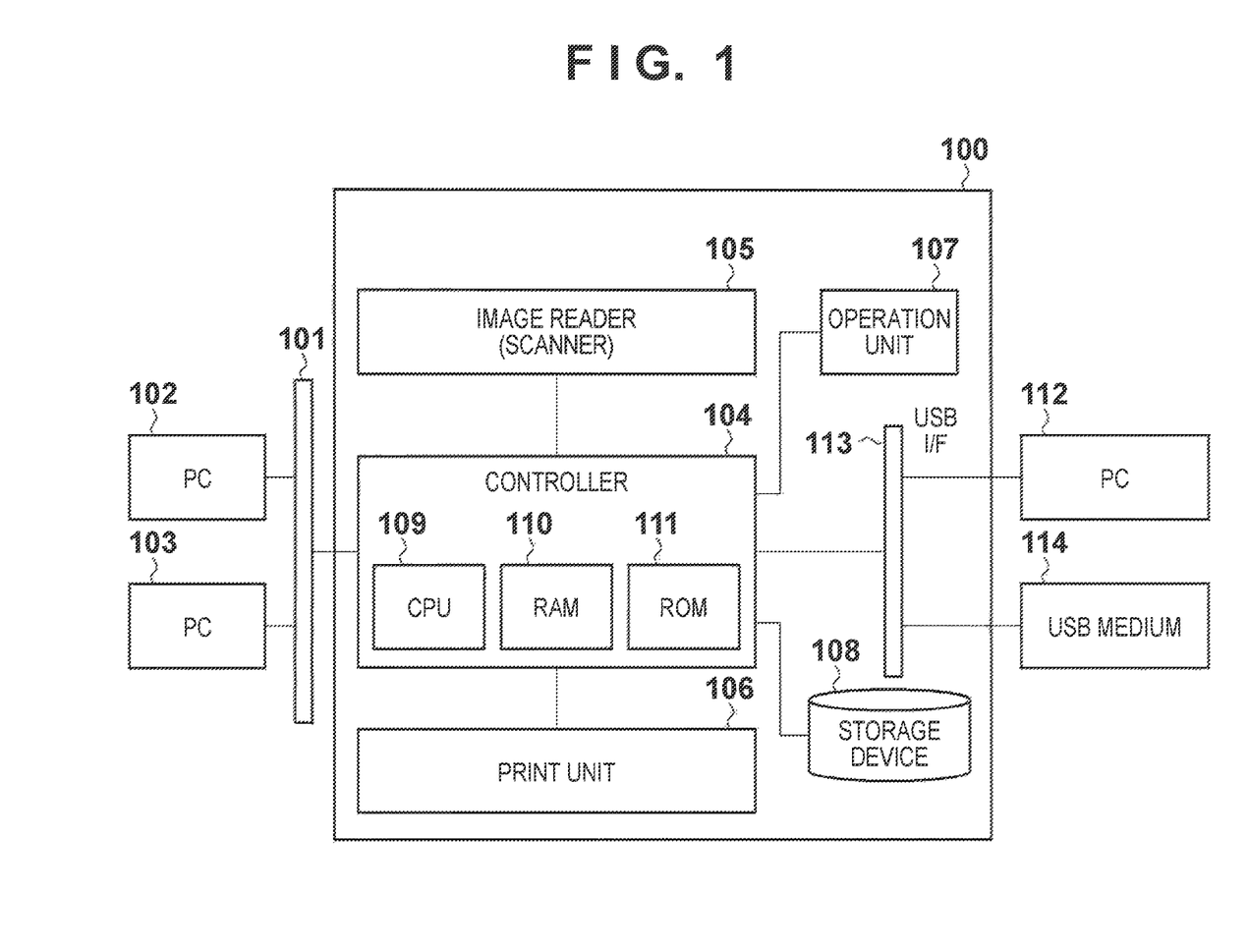
FIG. 1 illustrates an exemplary structure of a system including a plurality of PCs and an image formation apparatus.

FIG. 1 illustrates an exemplary structure of a system including a plurality of PCs and an image formation apparatus. An image formation apparatus 100 is connected to PCs 102 and 103 via a communication network such as a local area network (LAN) 101.

The image formation apparatus 100 includes an image reading unit (scanner) 105 as an image input device; a print unit 106 as an image output device; an operation unit 107; a storage device 108; and a controller 104 that controls these units. The controller 104 is provided with a CPU 109, a RAM 110, a ROM 111 and the like, and is configured so that the CPU 109 performs centralized control of the image formation apparatus 100 as a whole in accordance with programs stored in the ROM 111 and other storage media. The RAM 110 is used as a work area of the CPU 109, for example.

The scanner 105 reads image data. The print unit 106 outputs image data using a printer engine or the like. The operation unit 107 is provided with a keyboard to accept the input from a user and a liquid crystal panel to display image data and various functions and to let a user configure settings. The storage device 108 can store and save data such as image data and data written in printer control languages (ESC codes, PDL) and can be used as a temporary space for intermediate data.

The PCs 102 and 103 generate data (PDL data) written in a printer control language using a printer driver in accordance with a print instruction requested by an application inside the PCs via an OS, and transmit the data to the image formation apparatus 100 via the LAN 101.

Similarly to the PCs 102 and 103, a PC 112 generates PDL data using a printer driver in accordance with a print instruction requested by an application inside the PC via an OS. The PC 112 is connected to the image formation apparatus 100 via a USB I/F 113 and transmits print data such as PDL data to the image formation apparatus 100.

When printing is performed using the printer driver, the printer driver creates print data including various types of print setting information necessary to printing such as a sheet size, paint quality, Nup and double-sided print setting.

Alternatively, instead of connecting to a PC or the like, a USB medium 114 such as a USB memory may be connected to the USB I/F 113. In such a case, a file in the USB medium 114 is selected through the operation unit 107 or the like, whereby print data is directly transmitted to the image formation apparatus 100.

In this case, unlike printing using the printer driver, print data of files such as PDF, PS and XPS stored in the USB medium does not include print settings added thereto. That is, an original file is transmitted to the image formation apparatus 100 as it is. Accordingly, print data without print settings necessary to printing such as a sheet size is transmitted to the controller 104.

Among these files, a PDF file has information on the width and the height of a Mediabox corresponding to a physical sheet size. On the other hand, a PS file and an XPS file do not have information indicating a physical sheet size. When printing an XPS file via a driver, print setting information called a PrintTicket may be added to the XPS file, whereby print setting information can be held in the file.

This PrintTicket, however, is optional for the XPS file, and therefore when printing is not a main purpose, the PrintTicket is not added to the file in some cases. For instance, when a file is saved in an XPS format through application software such as MS-Word, Excel or PowerPoint from Microsoft, since the file is saved for the purpose of usage in such an application, a PrintTicket will not be added. When a printed matter is scanned by the image formation apparatus 100 and a file is saved in an XPS format or when an XPS file is created and the file is attached to e-mail for transmission as well, since the file is saved for the purpose of usage in such an application, a PrintTicket will not be added.

The following describes a logical sheet size to be set for an XPS file during scanning.

(1) sheet size during scanning=in the case of an automatic operation, a sheet size close to the size scanned is automatically set. When a close sheet size is not available, a user is prompted to select and set one from standard sizes.

(2) sheet size during scanning=when a user is allowed to set any sheet size, a user inputs any value (mm) and the value is set as a logical sheet size.

(3) sheet size during scanning=in the case of a free size, the size of a sheet scanned is set as a logical sheet size.

Embodiment 1

Figure 2:
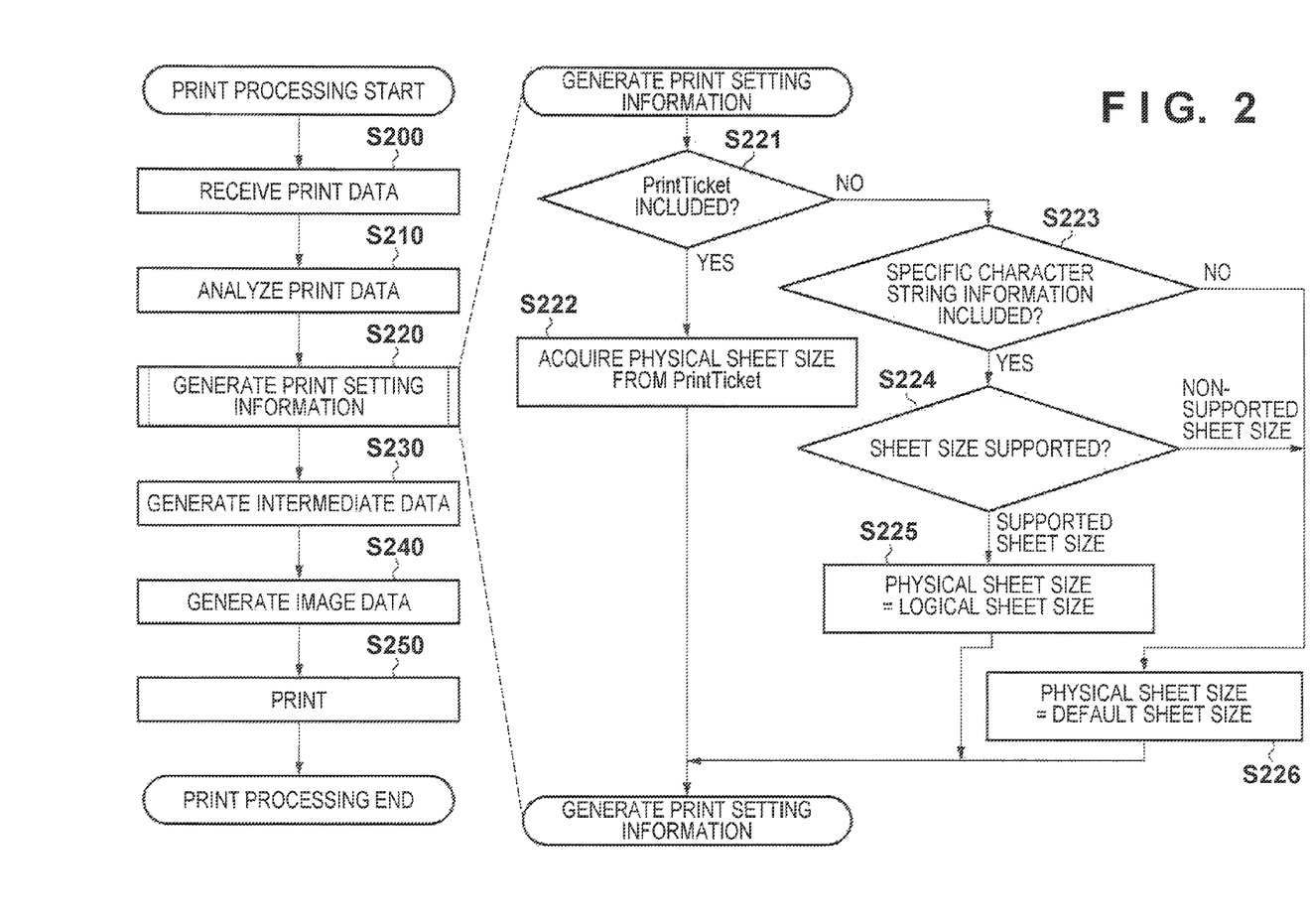
FIG. 2 is a flowchart illustrating the overall print processing when print data is received.

Referring now to FIG. 2, the overall print processing when print data is received so Embodiment 1 is described below. The procedure illustrated in the flowchart of FIG. 2 is stored in the RAM 110, the ROM 111, or the storage device 108, and is executed by the CPU 109.

The following exemplifies operations in the case of receiving XPS file. The present embodiment, however, is applicable to file formats other than the XPS file as well, such as a PS file that does not designate a physical sheet size. Note here that an XPS file includes logical sheet size information as a document size. An XPS file includes a PrintTicket including physical sheet size information to designate a print sheet in some cases and does not include such a PrintTicket in other cases.

At S200, the controller 104 receives print data input via the LAN 101 or the USB I/F 113. Next, at S210, the CPU 109 develops the print data received by the controller 104, analyzes information included in the print data, and develops necessary information in the RAM 110 of the controller 104, for example.

Next, at S220, print setting information relating to printing is generated, such as layout information that is required at S230 described later. More specifically, firstly at S221, determination is made as to whether the print data includes a PrintTicket or not on the basis of the analysis result of the print data at S210. When the result shows that a PrintTicket is included, the procedure proceeds to S222, where information on a physical sheet size is acquired from the PrintTicket and set as print setting information, and therefore the procedure ends.

On the other hand, when the determination at S221 shows that the print data does not include a PrintTicket, the procedure proceeds to S223, where determination is made as to whether the print data analyzed at S210 includes specific character string information or not. The specific character string information refers to a manufacturer name, a model name and the like. The manufacturer name and the model name may be combined for use or only one of the manufacturer name and the model name may be used. Instead of the manufacturer name and the model name, a user name, a device name, and other software names may be used. This specific character string information is embedded in an lean XPS file by the image formation apparatus when the XPS file is generated by scanning an image.

When it is determined at S223 that specific character string information is included, the procedure proceeds to S224, where determination is made as to whether or not the width and the height of a fixed page exceed a maximum sheet size that the image formation apparatus 100 supports. Such determination is required because the width and the height of a fixed page in the print data exceeding a maximum sheet size that the image formation apparatus 100 supports causes a failure in correct printing by the image formation apparatus 100. In Embodiment 1, since the sheet size is changed based on the presence or not of specific character string information, determination is made as to the sheet size that the image formation apparatus 100 supports. Meanwhile, when other types of information are to be changed based on the presence or not of specific character string information, determination is made as to whether or not such information is within a range that the image formation apparatus 100 supports.

When it is determined at S224 that the width and height are outside of the supported range, the procedure proceeds to S226, where a physical sheet size necessary to generate layout information is set using information that is not included in the print data. The information that is not included in the print data refers to value stored in the RAM 110, the ROM 111, or the storage device 108, for example, which may be a value set as a default value, a value set by user through the operation unit 107 or the like. On the other hand, when it is determined at S224 that the width and height are within the supported range, the procedure proceeds to S225, where information included in the print data is set as a physical sheet size used for printing.

Next, at S230, intermediate data is generated on the basis of the print setting information generated at S220 and information for intermediate data generation included in the XPS file. Next, S240, image data corresponding to one page is generated on the basis of the intermediate data. When image data corresponding to all pages is generated, such data is spooled to the storage device 108. Than at S250, the spooled image data is sent to the print unit 106 and printed by a printer engine. Herein, when a sheet of the sheet size set at S220 is available, printing is performed using such a sheet. When such a sheet is not available, a warning is issued about paper-out to urge a user to set a sheet, and printing is performed on the set sheet. When the set sheet size is a nonstandard size, a request for a sheet of the set nonstandard user-defined sheet size is made to urge a user to set such a sheet for printing, and printing is performed on the set sheet.

In this way, only when the specific character string information is included, print setting information is generated using information in the print data, whereby the following advantageous effects can be expected. If determination on the specific character string information is not made, a printing sheet size for the print data without a PrintTicket will be a logical sheet size or a default value set beforehand in the apparatus.

Such a logical sheet size, however, is not attached for the printing purpose, and the size may be for displaying in an application on a screen (such as 4:3) that is not intended by the user. Alternatively, when a supported sheet is not available for printing, a print error may occur. To cope with this, printing in that case is desirably performed using a default setting of the apparatus without using a logical sheet size.

On the other hand, when a standard sheet size such as A4 or A3 is set as a logical sheet size with the user's intention, printing as intended by the user is enabled by setting the logical sheet size as a physical sheet size. In such a case, printing using a logical sheet size included in the print data is preferable to printing using a default setting value or the like of the apparatus.

In another case, any sheet size defined by a user may be set as a logical sheet size. In that case, even when the sheet is of a nonstandard size, printing using a logical sheet size included in the print data is desirable.

In this way, a logical sheet size reflects the user's intention in some cases and does not reflect in other cases depending on the situation when the file was created. Accordingly, it is necessary to determine whether the logical sheet size was set with the user's intention or not. Attaching a PrintTicket enables a user's intended value to be set.

The attachment of a PrintTicket, however, is optional for a file format, and therefore it is important for the apparatus to perform printing correctly even for a file without a PrintTicket attached thereto.

Then, the presence or not of specific character string information is determined, thereby determining whether the logical sheet size was set with the user's intention or not. For instance, when the print data includes the character string of a product name B of a manufacturer A, it is determined that the file was created by scanning with the product B of the manufacturer A. In this case, since it is known in advance that information on the scanned sheet size is set as the logical sheet size, printing is performed by setting the logical sheet size as a physical sheet size. Conversely, when the print data does not include specific character string information, the apparatus cannot determine the users intention for file creation. Therefore, printing is performed using a default value of the apparatus decided beforehand and not the logical sheet size.

As a result, even when printing is performed without considering the situation when the user created the file, a preferable printing result can be obtained.

Embodiment 2

The following describes Embodiment 2 according to the present invention in detail. Embodiment 1 describes the case where print information includes one kind of hint information. Meanwhile, Embodiment 2 describes the case including a plurality of kinds of hint information. The following describes processing for physical sheet size setting and double-sided print setting based on specific character string information.

The specific character string information can be added when a file is created or when an XPS file is generated using an application on a PC. Alternatively, such information can be added when a printed matter is scanned to be a file with a MFP or the like.

Specific character string information indicating double-sided printing capability can be added when a file is created using an apparatus such as an MFP, and a user can arbitrarily designate such information using the operation unit 107 during scanning using the apparatus. Alternatively, when a printed matter to be input is a double-sided-printed matter, specific character string information designating double-sided printing can be automatically embedded in an XPS file. When creating an XPS file by scanning a printed matter using an MFP or the like, a user may input a username for login. In that case, specific character string information can be added on the basis of the user information for login.

Figure 3:
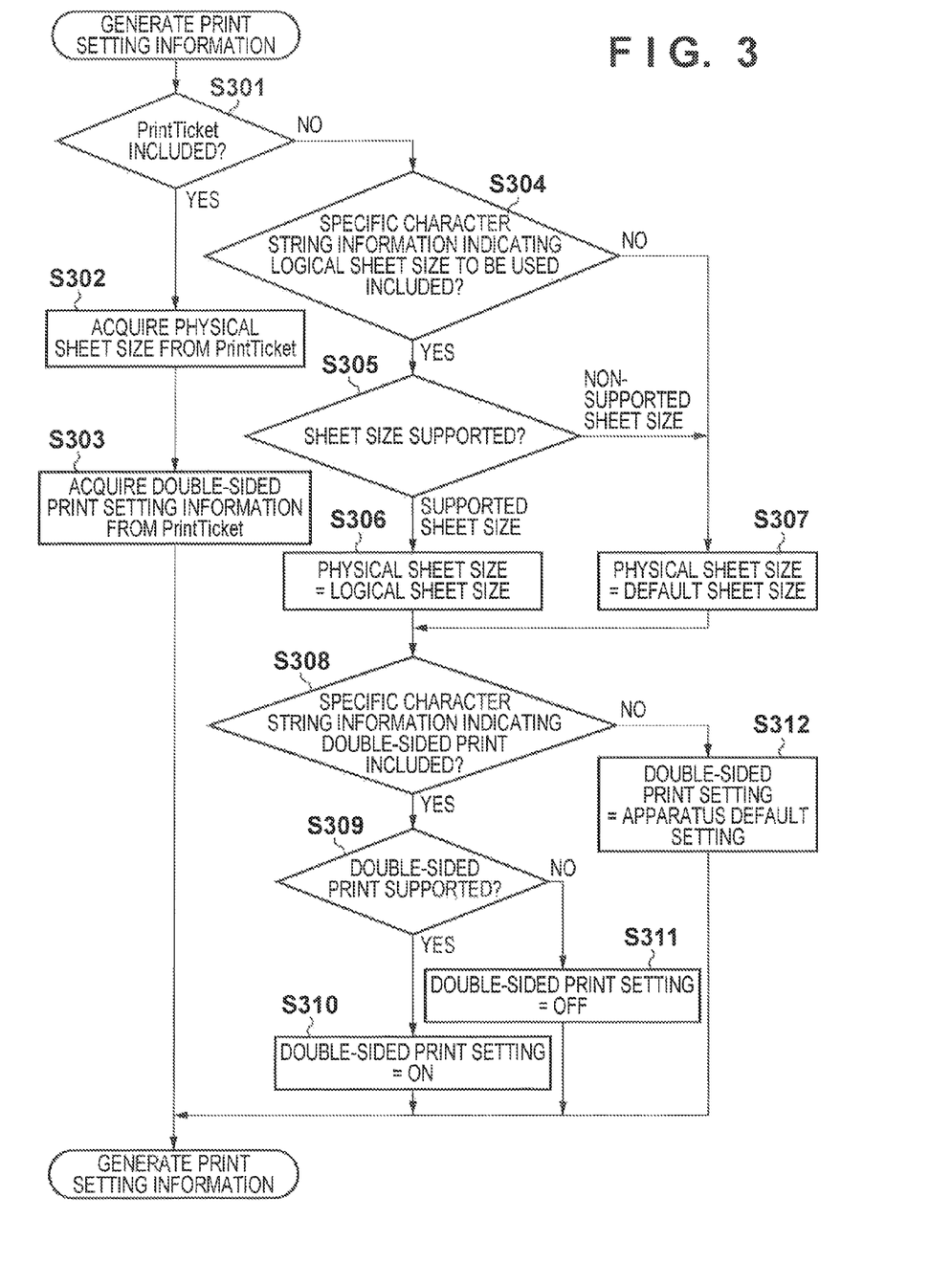
FIG. 3 is a flowchart illustrating generation processing of print setting information in Embodiment 2.

Since the system configuration of Embodiment 2 is similar to that of Embodiment 1 illustrated in FIG. 1, the description thereof is omitted. Referring to FIG. 3, generation processing of print setting information in Embodiment 2 is described below. The procedure illustrated in this flowchart is stored in the RAM 110, the ROM 111, or the storage device 108, and is executed by the CPU 109. FIG. 3 illustrates the processing corresponding to S220 of FIG. 2 in Embodiment 1, and the descriptions on the processing at S200, S210, and S230 to S250 are omitted.

Firstly at S301, determination is made as to whether print data in a PrintTicket or not on the basis of the analysis result of the print data at S210. When the determination result is that the print data includes a PrintTicket, the procedure proceeds to S302 to acquire information on a physical sheet size from the PrintTicket. Next, at S303, setting relating to double-sided-printing is also acquired from the PrintTicket to be reflected in the setting for printing, and thereafter this process ends.

On the other hand, the procedure proceeds to S304 when it is determined at S301 that the print data does not include a PrintTicket. Since the processing from S304 to S307 is similar to the processing from S223 to S226 of FIG. 2 the descriptions thereon are omitted.

Next, at S308, determination is made as to whether specific character string information indicating double-sided-print setting is included or not. When the determination result is that specific character string information indicating double-sided-print setting is included, the procedure proceeds to S309, where determination is made as to whether the image formation apparatus 100 supports double-sided printing or not. When the determination result is that the image formation apparatus 100 supports the double-sided printing, the procedures proceeds to S310 to make double-sided-print setting valid. On the other hand, when the image formation apparatus 100 does not support double-sided-printing, the procedure proceeds to S311 to set single-sided print setting.

When it as determined at S308 that specific character string information indicating double-sided-print setting is not included, the procedure proceeds to S312, and double-sided print setting is set on the basis of information that is not included in the print data. Similarly to Embodiment 1, the information that is not included in the print data refers to a value stored in the RAM 110, the ROM 111, or the storage device 108, for example, which may be a value set as a default value, a value set by a user through the operation unit 107 or the like.

As stated above, when a file is created using a device such as a multifunction peripheral, specific character string information may be embedded in a file. Such embedded information leads to an advantageous effect of enabling automatic attachment of information on a paper medium that was input, such as double-sided print setting.

In the case where user performs any print setting using an application on a PC and saves an XPS file, a PrintTicket will be attached thereto. In that case, the PrintTicket that was attached with the user's intention is used with priority, and therefore printing can be performed as intended by the user.

Embodiment 3

The following describes Embodiment 3 according to the present invention in detail. In Embodiment 3, when a PrintTicket is not attached, determination is made as to whether a specific character string indicates graphics, images or text or not, and print setting suitable for each character string is performed.

Figure 4:
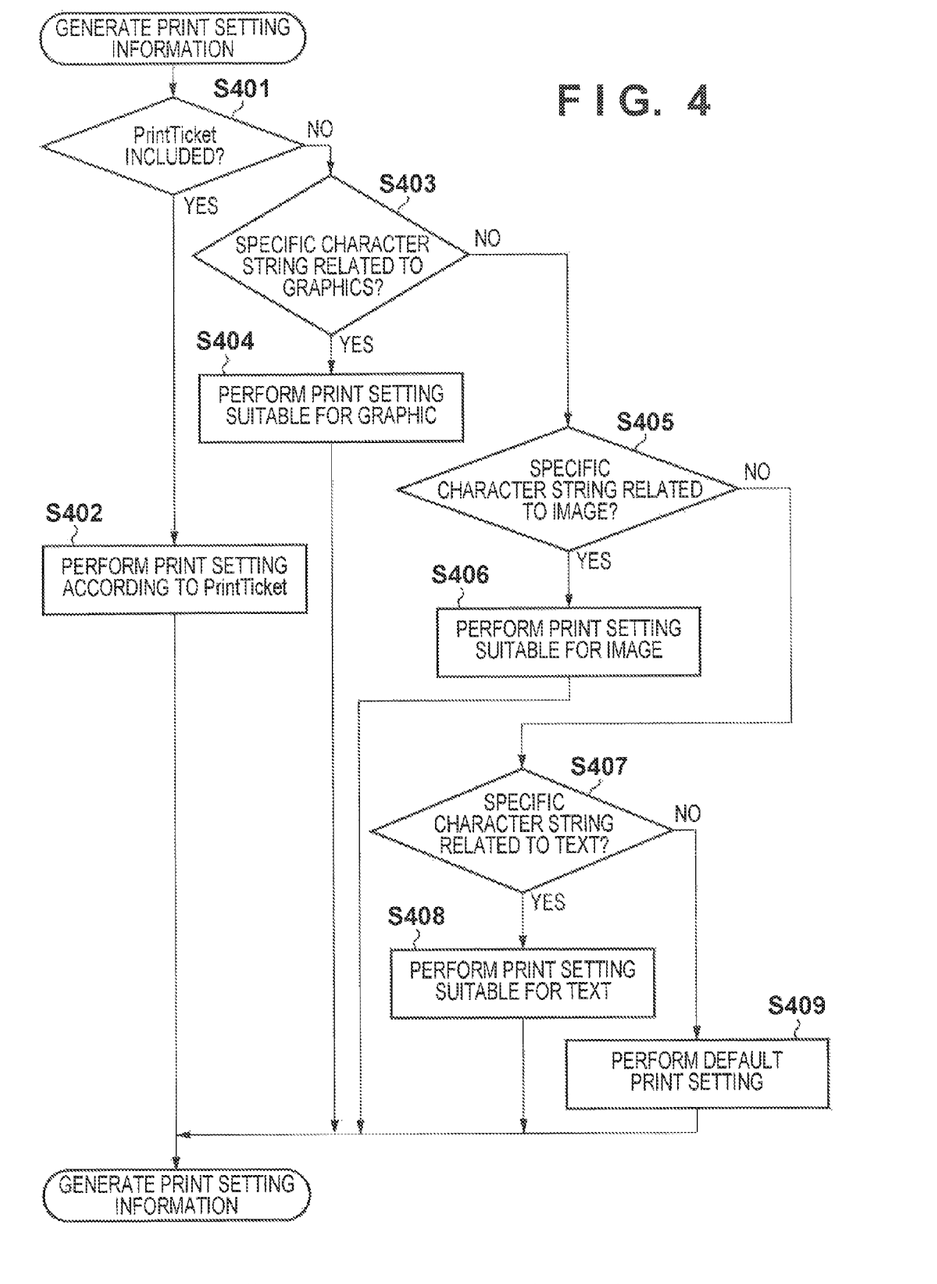
FIG. 4 is a flowchart illustrating generation processing of print setting information in Embodiment 3.

Since the system configuration of Embodiment 3 is similar to that of Embodiment 1 illustrated in FIG. 1, the description thereof is omitted. Referring to FIG. 4, generation processing of print setting information in Embodiment 3 is described below. The procedure illustrated in this flowchart is stored in the RAM 110, the ROM 111, or the storage device 108, and is executed by the CPU 109. FIG. 4 illustrates the processing corresponding to S220 of FIG. 2 in Embodiment 1, and the descriptions on the processing at S200, S210, and S230 to S250 are omitted.

Firstly at S401, determination is made as to whether print data includes a PrintTicket or not. When the determination result is that the print data includes a PrintTicket, the procedure proceeds to S402 to perform setting for printing on the basis of information set in the PrintTicket.

On the other hand, when it is determined that the print data does not include a PrintTicket, the procedure proceeds to S403, where determination is made as to whether specific character string information relates to graphics or not. Examples of the specific character string information used include an application name. For instance, when a file includes character string information indicating that the file was created using an application dealing with graphics such as CAD, the type of the print data is determined as graphics data. In this case, the procedure proceeds to S404 to set print information suitable for graphics.

When the specific character string information does not relate to graphics, the procedure proceeds to S405, where determination is made as to whether the specific character string information indicates images or not. When the specific character string information indicates images, the procedure proceeds to S406 to set print information suitable for images. For instance, settings such as contrast, density and color are optimized for the image, which are set as the print information.

When it is determined that the specific character information does not relate to images, the procedure proceeds to S407, where determination is made as to whether the specific character string information relates to text or not. When the determination result is that the specific character string information relates to text, the procedure proceeds to S408 to set print information suitable for text. For instance, for text, settings of 2-in-1 or double-sided print setting can be made valid.

When the determination result is that the specific character string information does not relate to text, the specific character string does not correspond to any type, and therefore the procedure proceeds to S409, where a default value set beforehand in the apparatus is set as the print information, for example.

In this way, determination is made as to the presence or not of character string information such as an application name indicating application information included in the file whereby print setting suitable for the properties of the application can be automatically attached.

In Embodiment 3, print setting is performed in accordance with the type of the print data. Instead, a username may be used for the specific character string information, whereby settings such as Nup setting, double-sided print setting, spool setting and the like can be automatically switched for printing in accordance with the setting values for each user.

According to the present invention, when print setting information to be used for printing is not set for print data, print setting information can be generated from specific character string formation in the print data, whereby printing can be performed with print setting suitable for an application or as intended by a user.

Other Embodiments

Aspects of the present invention can also be realized by a computer of a system or apparatus (or executes such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-05967, filed Mar. 17, 2011, which is hereby incorporated by reference herein in its entirety.

What is claimed is:

1. An apparatus comprising:
 a receiving unit configured to receive print data including logical sheet size information;
 a first determination unit configured to determine whether physical sheet size information is included in the received print data;
 a second determination unit configured to determine whether specific information indicating that the received print data is obtained by scanning is included in the received print data; and
 a setting unit configured to:
  set, when it is determined that physical sheet size information is not included and the specific information is not included, physical sheet size information as equivalent to default sheet size information,
 wherein at least one of the receiving unit, the first determination unit, the second determination unit, and the setting unit is implemented by a processor.

2. The apparatus according to claim 1, wherein the setting unit is configured to set, when it is determined that physical sheet size information is not included and the specific information is included, physical sheet size information as equivalent to the logical sheet size information.

3. The apparatus according to claim 1, wherein the specific information is at least one of a manufacturer name of an apparatus performing the scanning, a model name thereof and a combination of the manufacturer name and the model name.

4. The apparatus according to claim 1, the apparatus further comprising:
 a third determination unit configured to determine whether the logical sheet size information is included in a predetermined sheet size information set,
 wherein the setting unit is configured to:
  set, when it is determined that physical sheet size information is not included, the specific information is included and the logical sheet size information is included, physical sheet size information as equivalent to the logical sheet size information, and
  set, when it is determined that physical sheet size information is not included, the specific information is included and the logical sheet size information is not included, physical sheet size information as equivalent to default sheet size information.

5. The apparatus according to claim 1, wherein the specific information indicates that the received print data is obtained by scanning by a predetermined model of a copier.

6. The apparatus according to claim 1, wherein the setting unit is configured to set, when it is determined that physical sheet size information is not included and the specific information is included, physical sheet size information on a basis of the logical sheet size information.

7. An apparatus, comprising:
 a receiving unit configured to receive print data including logical sheet size information;
 a first determination unit configured to determine whether physical sheet size information is included in the received print data;
 a second determination unit configured to determine whether a specific manufacturer name is included in the received print data; and
 a setting unit configured to:
  set, when it is determined that physical sheet size information is not included and the specific manufacturer name is not included, physical sheet size information as equivalent to default sheet size information, and
  set, when it is determined that physical sheet size information is not included and the specific manufacturer name is included, physical sheet size information on a basis of the logical sheet size information,
 wherein at least one of the receiving unit, the first determination unit, the second determination unit, and the setting unit is implemented by a processor.

8. The apparatus according to claim 7, wherein the specific manufacturer name is a name of a manufacturer which manufactured a scanner which generated the print data by scanning a document.

9. An apparatus, comprising:
 a receiving unit configured to receive print data including logical sheet size information;
 a first determination unit configured to determine whether physical sheet size information is included in the received print data;
 a second determination unit configured to determine whether at least a part of a specific manufacturer name and a specific device name is included in the received print data; and
 a setting unit configured to:
  set, when it is determined that physical sheet size information is not included and at least a part of the specific manufacturer name and the specific device name is not included, physical sheet size information as equivalent to default sheet size information, and
  set, when it is determined that physical sheet size information is not included and at least a part of the specific manufacturer name and the specific device name is included, physical sheet size information on a basis of the logical sheet size information,
 wherein at least one of the receiving unit, the first determination unit, the second determination unit, and the setting unit is implemented by a processor.

10. The apparatus according to claim 9, wherein the specific manufacturer name is a name of a manufacturer which manufactured a scanner which generated the print data by scanning a document, and the specific device name is a name of the scanner.

11. A method comprising:
 receiving print data including logical sheet size information;
 determining whether physical sheet size information is included in the received print data;
 determining whether specific information indicating that the received print data is obtained by scanning is included in the received print data; and
 setting, when it is determined that physical sheet size information is not included and the specific information is not included, physical sheet size information as equivalent to default sheet size information,
wherein at least one of the receiving step, the determining steps, and the setting step is performed by a processor.

12. The method according to claim 11, further comprising setting, when it is determined that physical sheet size information is not included and the specific information is included, physical sheet size information as equivalent to the logical sheet size information.

13. The method according to claim 11, wherein the specific information is at least one of a manufacturer name of an apparatus performing the scanning, a model name thereof and a combination of the manufacturer name and the model name.

14. The method according to claim 11, further comprising:
determining, by the processor, whether the logical sheet size information is included in a predetermined sheet size information set;
setting, when it is determined that physical sheet size information is not included, the specific information is included and the logical sheet size information is included, physical sheet size information as equivalent to the logical sheet size information; and
setting, when it is determined that physical sheet size information is not included, the specific information is included and the logical sheet size information is not included, physical sheet size information as equivalent to default sheet size information.

15. The method according to claim 11, wherein the specific information indicates that the received print data is obtained by scanning by a predetermined model of a copier.

16. The method according to claim 11, further comprising setting, when it is determined that physical sheet size information is not included and the specific information is included, physical sheet size information on a basis of the logical sheet size information.

* * * * *